Figure 1:
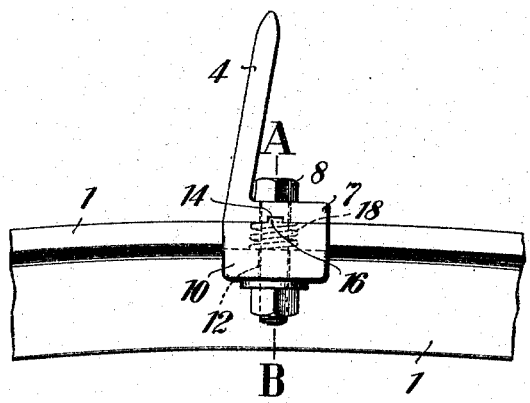

C. GLEICHE.
TRACTION WHEEL.
APPLICATION FILED OCT. 27, 1914.

1,308,062. Patented July 1, 1919.

Witnesses:
Josef Pejchar
Charles A. Mathé

Inventor:
Carl Gleiche
by John Locka
Attorney:

UNITED STATES PATENT OFFICE.

CARL GLEICHE, OF BERLIN, GERMANY, ASSIGNOR TO STOCK MOTORPFLUG GESELLSCHAFT MIT BESCHRANKTER HAFTUNG, OF BERLIN, GERMANY, A CORPORATION OF GERMANY.

TRACTION-WHEEL.

1,308,062.   Specification of Letters Patent.   Patented July 1, 1919.

Application filed October 27, 1914. Serial No. 868,820.

*To all whom it may concern:*

Be it known that I, CARL GLEICHE, a citizen of the German Empire, and resident of Berlin, Germany, have invented certain new and useful Improvements in Traction-Wheels, of which the following is a specification.

The wheel rims of vehicles, more particularly of agricultural machines such for instance as motor plows, when in operation off the road must have grippers, ribs or the like on their treads to produce the necessary working resistance and prevent the wheels sinking into and becoming embedded in the ground. When the machine is traveling on a road, these projecting members must obviously not come into contact with the road surface, so that the grippers must be either removed, or the intervals between them filled by supplementary members which form a new tread surface for the wheels of the vehicle. It is therefore necessary that such grippers or supplementary members be capable of being readily attached to or detached from the wheel rims, while further, there must be a minimum number of parts so as to reduce as far as possible the risk of losing any of them.

These requirements are entirely fulfilled by the device according to my invention for securing grippers or like additional parts to the wheel rims of agricultural machines. This device comprises in the main attachment irons or clamps overlapping the inner surface of the wheel rim and bearing on the grippers or other additional parts, such as are well known for clamping work to the benches of machine tools. These clamps form the holding device proper for the grippers or like parts to be secured thereby, while their movement on the wheel rim is prevented by pins or studs secured to the grippers and projecting into the rim.

Compared to the usual method of securing grippers and the like, the device according to my invention has the substantial advantage that it is merely necessary to relieve the pressure of the clamps on the inner surface of the wheel rim, to enable the gripper in question to be removed, while further the whole securing device remains on the gripper, so that a detached gripper forms a single unit with its attaching device. Consequently, when a screw bolt is used for connecting the clamp to the gripper, it is sufficient to give the securing nut a few turns, in order to loosen the clamp, without it being necessary to detach any nuts from the bolts and thus risk losing them as frequently happened hitherto.

A construction of a device according to my invention for securing a gripper to the wheel of a motor plow, is illustrated by way of example in the accompanying drawing.

Figure 2:
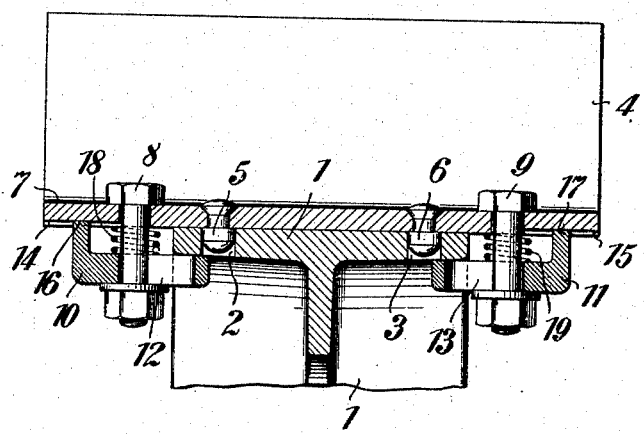

Figure 1 is a side elevation of a portion of the wheel rim with a gripper secured to it according to my invention, and Fig. 2 is a section on line A—B of Fig. 1.

The wheel rim 1 is provided in the well known manner with holes 2, 3 through which were passed two screw bolts when the gripper 4 was secured to the rim in the manner hitherto usual. According to my invention, studs 5, 6 riveted to the flange 7 of the gripper 4, adjoining the rim 1 engage these holes. At both sides of the wheel, bolts 8, 9 force clamps 10, 11 against the inner surface of the rim 1, the feet of these clamps bearing against the inner surface of the gripper flange 7.

The clamps are provided with elongated holes 12, 13 for the bolts 8, 9. Extending in the same direction as the elongated holes 12, 13 i. e. in the longitudinal direction of the gripper 4, grooves 14, 15 are formed on the inner surface of the gripper flange 7 with which engage projections 16, 17 on the feet of the clamps. Between the gripper flange 7 and the clamps 10, 11 are arranged pressure springs 18, 19.

For detaching the device (which is shown in the drawing in its fixed position), the nuts on the bolts 8, 9 must be slightly loosened on their bolts. The pressure springs 18, 19 immediately become operative, and press the clamps 10, 11 toward the center or axis of the wheel, which is of importance, for instance in case of marshy and clayey ground, where the clamps 10, 11 easily adhere to the gripper and rim. The clamps 10, 11 are then drawn outward until the inner ends of the elongated holes 12, 13 engage the bolts 8, 9. As soon as the clamps have been moved away from the rim 1, the gripper 4 can be removed, the whole clamping device remaining attached thereto and forming one unit therewith. The further advantage of the springs 18, 19 here becomes apparent, as they maintain the device ready for re-application, by pressing the clamps 10, 11 away from the gripper flange 7.

The guides constituted by the grooves 14, 15 and the projections 16, 17 which engage them are intended to give the clamps 10, 11 the correct position when the gripper 4 is being applied for owing to their coöperation with the elongated guide holes 12, 13 sliding relatively to the bolts 8, 9 the clamps without any further manipulation or adjustment can be driven by a blow with a hammer or a spanner, in a straight line, parallel to the length of the grippers, over the inner surface of the rim 1.

A special advantage of the fixing device described lies in the fact that not only the holes 2, 3 provided in the wheel rim 1 for the hitherto usual method of fixing, are used in the new method of fixing grippers and other additional wheel rim parts, but also in the fact that the grippers or the like already used, can be utilized for the new method of fixing with only a slight alteration. The bolts 8, 9 as well as the studs 5, 6 can of course be riveted to the gripper flange 7. Moreover, the clamps 10, 11 may also be made without longitudinal holes, if they are sufficiently narrow, and the bolts 8, 9 are sufficiently far from the rim 1, so that the clamps can be released by a turning to the extent of 90° about their bolts.

I claim:—

1. The combination, with a gripper adapted to extend over the outer surface of a wheel rim, of clamps bearing on said gripper and adapted to engage the inner surface of the wheel rim, means for connecting the said clamps with the gripper, and a stud secured to the gripper eccentrically to said connecting means and projecting inwardly from said gripper to engage the rim.

2. In a device for securing grippers to the wheel rims of vehicles, the combination of clamps overlapping the inner surface of the wheel rim and bearing on the grippers, means for attaching said clamps to the rim, studs secured to the grippers and projecting into the rim, and pressure springs inserted between the grippers and the clamps.

3. The combination, with a gripper adapted to extend over the outer surface of a wheel rim, of clamps bearing on said gripper and adapted to engage the inner surface of the wheel rim, said clamps being provided with elongated holes extending lengthwise of the gripper, bolts connecting the clamps with the gripper and extending through said holes, and a stud secured to the gripper and adapted to project into the rim.

4. In a device for securing grippers to the wheel rims of vehicles, the combination of clamps overlapping the inner surface of the wheel rim and bearing on the grippers, bolts connecting the grippers and the clamps, said clamps being provided with elongated holes extending parallel to the length of the grippers, and studs secured to the grippers and projecting into the rim, said clamps being movable relatively to the grippers in guides extending in the same direction as the elongated bolt holes.

5. The combination, with a gripper adapted to be applied to the outer surface of a vehicle wheel rim, of a clamp bearing on said gripper and adapted to engage the inner surface of such rim, means for connecting said clamp with said gripper and for pressing the clamp toward the gripper and against the rim, and a stud projecting inwardly from the gripper eccentrically to said connecting means and adapted to project into the rim.

6. The combination, with a gripper adapted to be applied to the outer surface of a wheel rim, of a clamp having an inner portion spaced from said gripper and adapted to engage the inner surface of the wheel rim, and also having at its outer portion, a projection adapted for engagement with said gripper, and pressure-exerting means connecting the clamp with the gripper between said inner portion and said projection.

7. The combination, with a gripper adapted to be applied to the outer surface of a wheel rim, of a clamp having an inner portion spaced from the gripper and adapted to engage the inner surface of said rim, the outer portion of said clamp being adapted for engagement with said gripper, a connecting bolt extending through the gripper and through the clamp between the points at which said clamp engages the rim and the gripper respectively, a nut on said bolt, to engage the clamp on one side and force it toward the gripper, and a spring engaging said clamp on the opposite side and adapted to be interposed between said clamp and the wheel rim.

8. The combination, with a gripper adapted to be applied to the outer surface of a vehicle wheel rim, and provided with a longitudinal guide surface, of a clamp in engagement with said longitudinal guide surface and movable lengthwise thereof, said clamp being adapted to engage the inner surface of the wheel rim, and means for connecting the clamp with the gripper and for pressing the clamp toward the gripper and against the wheel rim.

9. The combination, with a gripper adapted to be applied to the outer surface of a vehicle wheel rim, and provided with a longitudinal guide surface, of a clamp in sliding engagement with said guide surface and adapted to engage the inner surface of the wheel rim, said clamp being provided with an elongated opening extending in the same direction as said guide surface, and means, extending through said opening, for connecting the clamp with the gripper.

In testimony whereof, I have signed this specification in the presence of two subscribing witnesses.

CARL GLEICHE.

Witnesses:
HERMANN HEIM,
FRITZ LANGE.